United States Patent [19]

Fidler et al.

[11] Patent Number: 4,505,202
[45] Date of Patent: Mar. 19, 1985

[54] MULTI SOURCE CARTRIDGE FOR DISPERSING A RIOT CONTROL AGENT

[75] Inventors: John Fidler; John M. Green, both of Salisbury, England

[73] Assignee: The Secretary of State for Defence in Her Britannic Majesty's Government of the United Kingdom of Great Britain and Northern Ireland, London, England

[21] Appl. No.: 203,846

[22] Filed: Oct. 15, 1980

[30] Foreign Application Priority Data

Oct. 31, 1979 [GB] United Kingdom ................. 7937670

[51] Int. Cl.³ ................................................ F42B 4/00

[52] U.S. Cl. .................................... 102/357; 102/439; 102/364; 102/505

[58] Field of Search ............... 102/337, 334, 340, 364, 102/365, 367, 370, 342, 351, 352, 357, 360, 377, 378, 430, 439, 438, 489, 505, 520–523; 229/DIG. 12; 206/497; 220/4 E

[56] References Cited

U.S. PATENT DOCUMENTS

| | | | |
|---|---|---|---|
| 1,434,784 | 11/1922 | Lucas | 102/334 |
| 1,771,455 | 7/1930 | Wiley | 102/364 |
| 2,803,865 | 8/1957 | Eljanian et al. | 220/4 B |
| 3,023,703 | 8/1955 | Beatty . | |
| 3,143,965 | 8/1964 | Pointe | 102/505 |
| 3,318,241 | 6/1961 | Gould . | |
| 3,431,852 | 3/1969 | Fowler | 102/334 |
| 3,712,219 | 5/1968 | Blair et al. . | |
| 3,720,167 | 3/1973 | Mainhardt | 102/351 |
| 3,721,196 | 3/1973 | Willis et al. | 102/505 |
| 3,855,932 | 12/1974 | Parker et al. | 102/378 |
| 3,930,448 | 8/1974 | Barber et al. . | |
| 3,938,439 | 6/1974 | Walton . | |
| 3,954,060 | 8/1967 | Haag et al. . | |
| 4,155,308 | 11/1977 | Murawski . | |
| 4,171,743 | 10/1979 | Mascia et al. | 220/4 E |

FOREIGN PATENT DOCUMENTS

| | | | |
|---|---|---|---|
| 2343990 | 10/1977 | France | 102/505 |
| 819233 | 9/1959 | United Kingdom . | |
| 1248867 | 10/1971 | United Kingdom . | |
| 1302872 | 1/1973 | United Kingdom . | |
| 1331046 | 9/1973 | United Kingdom . | |
| 1534134 | 11/1978 | United Kingdom | 102/357 |

OTHER PUBLICATIONS

European Patent 0029078.

*Primary Examiner*—Harold J. Tudor
*Attorney, Agent, or Firm*—Pollock, Vande Sande and Priddy

[57] ABSTRACT

A projectile for dispersing a riot control agent material into the atmosphere at a target. The projectile is designed to open in flight and scatter a number of independent dispersal charges over a limited target area, and comprises a sabot in the form of a number of segments which are locked together prior to launching, which contains the dispersal charges and a delayed opening means which initiates opening in flight, thereby releasing the charges along approximately the same trajectory as the former projectile. In a preferred embodiment the sabot is cylindrical, in two segments hinged together at their rear end, locked together by either a collar or a pin and socket arrangement, and containing a number of cylindrical charges in line, with an axial channel. The projectile is fired from a gun, and firing initiates a pyrotechnic delay which activates an explosive or pyrotechnic charge in the channel and between the charges to open the sabot and activate and disperse the charges.

3 Claims, 3 Drawing Figures

U.S. Patent    Mar. 19, 1985    4,505,202

MULTI SOURCE CARTRIDGE FOR DISPERSING A RIOT CONTROL AGENT

The present invention relates to apparatus for dispersing smokes or riot-control agents.

Smoke generating materials or riot-control agents are frequently contained in a suitable projectile which may be thrown, shot from a gun or propelled by a rocket. The smoke or riot-control agent may be dispersed from such a projectile by a considerable variety of methods, for example blowing it out as a fine powder or liquid with a propellant or explosive device, disrupting a solid charge of material with a suitable explosive, or mixing a suitable material with a self combustible composition which vaporizes the material and ejects it as a particulate smoke together with the gas evolved on combustion.

It is a disadvantage of such projectiles that the smoke or riot-control agent is only dispersed from one source, i.e. the body of the projectile at the point where it comes to rest. This hinders the effective spreading of the smoke or riot-control agent over a large area and is thus a relatively inefficient method of dispersal. In the case of projectiles containing riot-control agents a further disadvantage of a single source dispersal is that such sources are easily neutralized, avoided, or knocked away by rioters or even thrown back.

Formerly, blow apart multi-source grenades, which burst and scatter a number of independent dispersal sources on or shortly before landing have been used. However in the case of air-burst grenades, sources tend to be scattered over a large area, while if the grenade bursts after it has landed it may still be possible for the projectile to be neutralized.

There remains a requirement for a multi-source projectile which can be fired accurately over a long range and air-burst to deposit its charges over a limited area.

According to the invention, a projectile comprises a sabot containing a plurality of separate charges from which a material may be dispersed into the atmosphere, said sabot being made in the form of a number of segments which are locked together prior to launching and a delayed opening means to initiate opening of said sabot in flight, to release said charges along approximately the same trajectory as the former projectile. The increased air resistance of the opened segments assists the opening of the sabot and causes the sabot to fall back leaving the separated charges in divergent free flight.

The term 'projectile' as used herein refers to any missile whether thrown, shot from a gun, rocket propelled or propelled by any other means, but the projectile of the invention is preferably shot from a gun or rocket propelled, as the higher velocity in this way will increase the range and also the air resistance in flight and thus facilitate opening of the sabot and separation of the charges.

The invention therefore provides a means by which a number of separate sources from which a smoke or riot-control agent may be dispersed, which are located over a small and well defined area, to achieve the best coverage of an area. Rioters would find such a projectile difficult to neutralize, as the release of separate charges would occur outside their reach.

The sabot should preferably be light, so as to maximize range, and should desirably be made of materials which are unlikely to cause any injury to persons should they be hit by the sabot or fragments of the sabot subsequent to opening. Suitable materials should be stable on long term storage under service conditions and resistant to rough handling and water or humidity. Suitable materials include plastic materials, resin impregnated cardboard or very light metal. A preferred material is polyethylene which possesses all these desirable properties.

The shape and size of the sabot will depend on the mode of use or propulsion etc. In a preferred embodiment the sabot is in the form of a cylinder suitable for shooting from a gun, split longitudinally into two segments which are hinged together at their rear end. The segments may be hinged together by any convenient means, for example the segments may be made separately and fastened together by a flexible washer at their rear end, or the sabot may be moulded integrally of plastics material. If the segments are moulded in their open configuration, then the natural elasticity of the material will assist opening in flight.

The sabot may be kept closed prior to launching by any suitable method, but should not be closed so tightly that the subsequent opening will require excessive force, which might damage the charges contained within. Suitable methods of closing include the use of tapes or heat-shrunk collars around the forward end of the sabot, or interlocking sections or pins and sockets.

The delayed opening means may comprise any convenient arrrangement and such devices will be well known to those skilled in the art. Most conveniently the delayed opening means will comprise a pyrotechnic delay fuse, activated by for example either a conventional fly-off lever cap striker ignition device in the case of a hand thrown grenade, or by the firing of a propellant charge in a projectile shot from a gun or propelled by a rocket, this fuse then subsequently igniting a small explosive charge or pyrotechnic propellant chain which both initiates the opening of the sabot and conveniently also activates the means for dispersing the material from the charges. In this case the explosive charge or propellant, while of sufficient power to initiate the opening of the sabot, should be of insufficient power to disintegrate the charges. The length of the delay between launching the projectile and opening will depend on the mode of use, but should be so arranged that the charges are scattered during flight. The use of a sabot in which opening only needs to be initiated by the opening means and is completed by air resistance as described above allows the use of a relatively small explosive or propellant charge to open the sabot.

The charges contained within the sabot may contain any suitable composition which may give off smoke or a riot control agent to be dispersed into the atmosphere. Appropriate compositions will be well known to those acquainted with the field. If an explosive charge is used to initiate opening of the sabot then the material may conveniently be dispersed by the use of a pyrotechnic composition acting either as a vaporizing composition, or as a gas generating propellant to disperse a powder or a liquid. The charges may be themselves fitted with an independent delay means, so that dispersal of the material may be further delayed after the charges are scattered. Dispersal of the material may in this case be by an explosive or disruptive charge.

Any convenient number of charges may be contained in the projectile, and the number will depend on the application. The charges may comprise blocks of compressed or moulded material, or may be contained in light sheaths. The charges may be mounted in any manner within the sabot which allows them to scatter when the sabot opens in flight, but most conveniently in a cylindrical projectile, the charges may take the form of short cylinders co-axial with the sabot and having an axial channel through which a suitable activating device, such as a small explosive charge, may pass. The use of an axially mounted activating device in this way allows for a symmetrical distribution of weight across the width of the projectile, and hence increased accuracy. Where the charges are not co-axial with the sabot, they will tend to be thrown sideways by the opening charge and, in a spun projectile, by the spin. Hence in such cases the opening should be delayed until much later in the flight for a given target area coverage.

Projectiles according to the invention may be propelled by any method which gives them sufficient velocity to open under the action of air resistance when opening is initiated. Most conveniently the projectile is fired from a gun by the action of a propellant charge and percussion primer. The projectile and propellant charge may be loaded separately into a gun or may advantageously be combined in a single round comprising a cartridge case which encloses and protects the projectile during storage.

The invention will now be described by way of example only with reference to the following diagrams in which.

Figure 1:
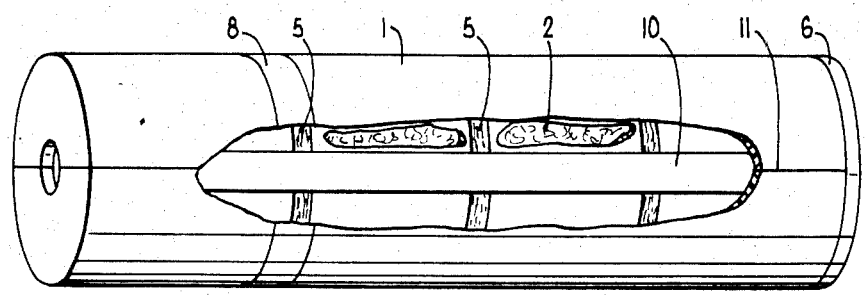
FIG. 1 shows a cutaway view of a riot-control projectile suitable for firing from a gun, closed by a heat shrunk tape.
Figure 2:
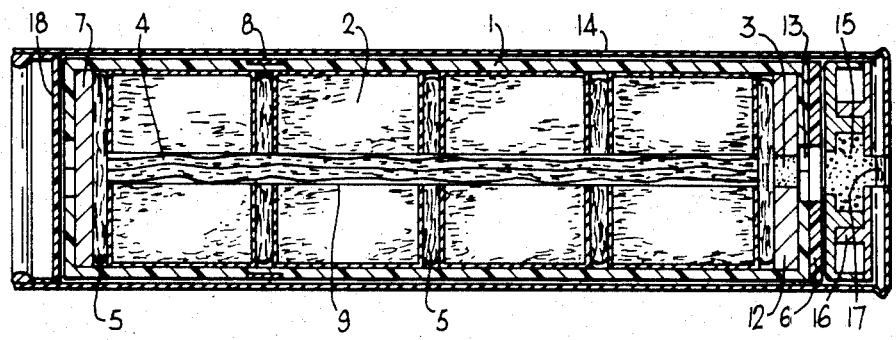
FIG. 2 shows a longitudinal sectional view through the projectile of FIG. 1.

With reference to FIGS. 1 and 2, a riot-control projectile comprises a cylindrical sabot 1 having a length-/diameter ratio about 2½:1 to 3:1, containing a plurality of cylindrical charges 2, a delay fuze 3 and an explosive or pyrotechnic opening and ignition charge 4 and 5. The sabot 1 is made of polyethylene and is longitudinally split into two segments. The two segments of the sabot are fastened together by a polyethylene washer 6 welded onto the rear end of the sabot, which acts as a hinge. A cardboard disk 7 seals the front end. The sabot is held closed by a heat-shrunk plastics tape 8, which fits into a circumferential groove near the front end of the sabot. The depth of the groove and the thickness of the tape are such that the tape does not project beyond the walls of the sabot.

The charges 2 are cylindrical with an axial central hole 9 and enclosed within individual thin metal cases. They are of such dimensions as to fit tightly inside the sabot, and are made of pyrotechnic riot-control or smoke-generating composition. They are held together by longitudinal tapes 10 which coincide with and hence seal the split 11 in the sides of the sabot.

The delay fuze 3 is of a conventional pyrotechnic composition, and is mounted in an axial channel in a cylindrical delay block 12 at the rear end of the sabot, so as to be ignited through a hole 13 in the sabot by the propellant charge by which the projectile is fired out of a gun. The delay block 12 produces even burning of the delay fuze 3, protects the delay fuze to some extent from atmosphere moisture and absorbs some of the impulse of firing. It may be made of light metal, preferably aluminum. The opening and ignition charge 4 and 5 comprises a primed cambric cord 4 which passes up the axial holes 9 of the charges 2 to communicate with cambric discs 5 located between the charges and at both ends of the sabot. The cambric discs 5 which are situated between the charges 2 are pierced with a central hole through which the cambric cord 4 is threaded.

One of the discs 5 is adjacent to the tape 8, and is capable of producing sufficient heat to melt the tape 8 without causing excessive damage or disintegrating the charges 2. Alterative explosive or propellant compositions may of course be used.

The projectile may be mounted within a cylindrical cartridge case 14 which may preferably be made of aluminum, or alternatively of cardboard or plastics materials, and which contains a propellant charge 15 within a propellant capsule/obturator 16 suitably pierced so as to ignite the delay charge 3 on firing. A conventional percussion primer cap 17 is mounted at the rear of the cartridge case, and the front of the cartridge case 14 is sealed by a light polyethylene closure 18 which retains the projectile and prevents the ingress of moisture.

In use, the propellant charge 15 ejects the projectile from the gun and ignites the pyrotechnic delay fuze 3. After a short period, the cambric cord and discs 4 and 5 are ignited, which ignites the charges 2 and melts the fastening tape 8. Under the action of the gas generated by the burning of the cambric, the two halves of the sabot 1 are forced apart, hinging about the rear end of the sabot, the intial opening being continued by the action of air resistance. As the sabot opens, its air resistance is increased, and its passage through the air is retarded. The charges 2 then continue in flight, following approximately the same trajectory as the former projectile, so as to be scattered over a limited target area to provide a number of independent sources from which the riot control agent or smoke is dispersed.

Figure 3:
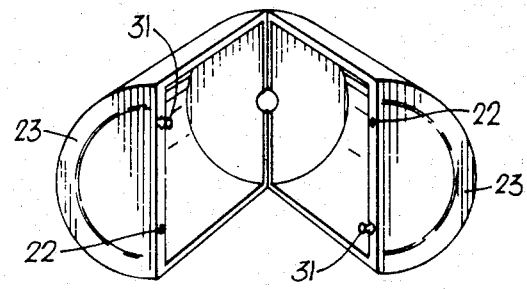
FIG. 3 shows a view of a riot-control projectile suitable for firing from a gun, closed by interlocking lugs and sockets.

FIG. 3 shows an alternative embodiment wherein the segments of the sabot are held together by cooperating lugs 31 and sockets 22 in the forward face 23 of the sabot and the heat-shrunk collar 8 is omitted. The other details of construction and the method of operation are unchanged.

What is claimed is:

1. A projectile comprising a cylindrical sabot which is split longitudinally into arc-shaped segments, means for hinging together the segments at the rear end of said sabot, locking means for locking the arc-shaped segments together in cylindrical sabot form, a plurality of annular riot control charges coaxially disposed within said sabot, each of said charges comprising a riot control agent, a sabot opening charge located between adjacent pairs of said riot control charges and within an axial channel passing through the riot control charges, said opening charge being of sufficient power to disengage said locking means and to open said sabot without disintegrating said riot control charges, and a pyrotechnic delay fuse located at the rear end of the sabot for igniting said sabot opening charge while the projectile is in flight, the launching of the projectile being operative to activate the pyrotechnic delay fuse which, while the projectile is still in flight, ignites said sabot opening charge to open the sabot by disengaging said locking means and forcing apart the hinged, arc-shaped segments, thereby releasing the riot control charges.

2. A projectile according to claim 1 wherein the locking means comprises a heat shrunk collar which surrounds said sabot, said collar being so positioned that ignition of said sabot opening charge causes said collar to melt thereby allowing the sabot to open.

3. A projectile according to claim 1 wherein said segments are locked together by a pin and socket arrangement.

* * * * *